US 12,304,361 B2

(12) United States Patent
Curts et al.

(10) Patent No.: US 12,304,361 B2
(45) Date of Patent: May 20, 2025

(54) SLIDING SEAT BOTTOM FOR A BOAT

(71) Applicant: MasterCraft Boat Company, LLC, Vonore, TN (US)

(72) Inventors: Chadrick E. Curts, Lenoir City, TN (US); Colin J. Schweigert, Knoxville, TN (US)

(73) Assignee: MasterCraft Boat Company, LLC, Vonore, TN (US)

( * ) Notice: Subject to any disclaimer, the term of this patent is extended or adjusted under 35 U.S.C. 154(b) by 526 days.

(21) Appl. No.: 17/711,266

(22) Filed: Apr. 1, 2022

(65) Prior Publication Data

US 2022/0348118 A1 Nov. 3, 2022

Related U.S. Application Data

(60) Provisional application No. 63/183,559, filed on May 3, 2021.

(51) Int. Cl.
| | |
|---|---|
| *B60N 2/06* | (2006.01) |
| *B60N 2/30* | (2006.01) |
| *B63B 3/54* | (2006.01) |
| *B63B 29/06* | (2006.01) |
| *B63B 29/04* | (2006.01) |

(52) U.S. Cl.
CPC ............ *B60N 2/062* (2013.01); *B60N 2/3002* (2013.01); *B63B 3/54* (2013.01); *B63B 29/06* (2013.01); *B63B 2029/043* (2013.01)

(58) Field of Classification Search
CPC ........ B60N 2/00; B60N 2/062; B60N 2/3002; B63B 29/00; B63B 29/04; B63B 29/06; B63B 2029/043; B63B 35/00; B63B 35/85; B63B 3/00; B63B 3/54
USPC .......................................................... 114/363
See application file for complete search history.

(56) References Cited

U.S. PATENT DOCUMENTS

| | | | |
|---|---|---|---|
| 794,777 A | 7/1905 | Bunnell | |
| 3,964,785 A | 6/1976 | Plume | |
| 4,085,473 A | 4/1978 | Franklin | |
| 4,637,081 A * | 1/1987 | Clark | ...................... B63B 29/04 |
| | | | 114/363 |
| 4,879,963 A | 11/1989 | Dionne | |
| D310,059 S | 8/1990 | Porter | |
| D322,422 S | 12/1991 | Carlson | |
| 5,136,963 A | 8/1992 | Zuzik | |
| D333,810 S | 3/1993 | Wenstadt | |

(Continued)

OTHER PUBLICATIONS

MasterCraft, 2013 Owner's Manual, pp. cover, ix, 2-23 to 2-26, and 3-27 to 3-28.

(Continued)

*Primary Examiner* — Lars A Olson
(74) *Attorney, Agent, or Firm* — Venable LLP (57) ABSTRACT

A boat includes a hull having a bow and a transom, a seat support structure, and an aft-facing seat positioned proximate to the transom and at least partially supported by the seat support structure. The aft-facing seat is positioned proximate to the transom and is at least partially supported by the seat support structure. The aft-facing seat includes a seat bottom configured to slide between an inward position and an outward position. When the seat bottom is in the outward position, the seat bottom is aft of its position in the inward position.

20 Claims, 6 Drawing Sheets

(56) References Cited

U.S. PATENT DOCUMENTS

| | | | |
|---|---|---|---|
| 5,320,059 | A | 6/1994 | Ikeda |
| 5,346,277 | A | 9/1994 | Holobaugh et al. |
| D356,289 | S | 3/1995 | Trent |
| D357,223 | S | 4/1995 | Thompson et al. |
| 5,481,998 | A | 1/1996 | Trent |
| 5,497,724 | A | 3/1996 | Brown et al. |
| 6,041,732 | A | 3/2000 | Ikeda |
| D429,682 | S | 8/2000 | Garland et al. |
| 6,145,458 | A | 11/2000 | Hattori |
| 6,257,667 | B1 | 7/2001 | Boren et al. |
| 6,371,559 | B1 | 4/2002 | Kienzle et al. |
| 6,431,109 | B1 | 8/2002 | Martin |
| D464,601 | S | 10/2002 | Aube et al. |
| 6,491,124 | B1 | 12/2002 | Thompson et al. |
| D469,053 | S | 1/2003 | Aube et al. |
| 6,672,240 | B1 | 1/2004 | Aube et al. |
| 6,837,173 | B2 | 1/2005 | Eck et al. |
| 6,886,490 | B2 | 5/2005 | Aube et al. |
| 7,000,557 | B1 | 2/2006 | Forbes et al. |
| D524,224 | S | 7/2006 | Guay et al. |
| 7,255,058 | B2 | 8/2007 | Forbes et al. |
| 7,513,211 | B1 * | 4/2009 | Farb ................ B63B 29/04 114/363 |
| 7,661,382 | B2 | 2/2010 | Wood et al. |
| 8,113,136 | B2 | 2/2012 | Mayrand et al. |
| D665,719 | S | 8/2012 | Watkins et al. |
| D679,236 | S | 4/2013 | Gros et al. |
| 8,517,466 | B1 | 8/2013 | Wizorek et al. |
| 8,616,143 | B2 | 12/2013 | Hancock, Jr. et al. |
| D700,127 | S | 2/2014 | Fuller, IV |
| 8,943,988 | B1 | 2/2015 | Guglielmo et al. |
| D743,318 | S | 11/2015 | Curts |
| 9,249,827 | B2 | 2/2016 | Serocki et al. |
| 9,650,117 | B2 | 5/2017 | Curts et al. |
| 10,336,411 | B2 | 7/2019 | Curts et al. |
| 10,604,217 | B2 | 3/2020 | Curts et al. |
| 10,933,774 | B2 | 3/2021 | Curts |
| 11,027,795 | B2 | 6/2021 | Curts et al. |
| 11,091,230 | B2 | 8/2021 | Curts et al. |
| 11,230,355 | B1 | 1/2022 | Curts et al. |
| 2004/0129196 | A1 | 7/2004 | Jesewitz |
| 2008/0196649 | A1 | 8/2008 | Kalil |
| 2009/0301378 | A1 | 12/2009 | Walbridge et al. |
| 2010/0037814 | A1 | 2/2010 | Sahr et al. |
| 2010/0319604 | A1 | 12/2010 | Mayrand et al. |
| 2011/0095592 | A1 | 4/2011 | Willard et al. |
| 2013/0160695 | A1 | 6/2013 | Gratz et al. |
| 2014/0225403 | A1 | 8/2014 | Shimada et al. |
| 2021/0284291 | A1 | 9/2021 | Curts et al. |
| 2021/0362811 | A1 | 11/2021 | Curts et al. |

OTHER PUBLICATIONS

Charles Plueddeman, Surf Everywhere, Boating, Mar. 2015, pp. cover, 10, 68-73.

The AL-24 Wake Boat, http://pevati.com/al-24/, last visited Aug. 4, 2014.

Bombardier Recreational Products Inc., 210 Wake, Aug. 4, 2011.

Yamaha Motor Corporation, 2014 Yamaha Boats.

Sea Ray Boats, 300 Sundeck, Sep. 2012.

Chaparral Boats, 2013 Chaparral Fleet Brochure, available at http://www.chaparralboats.com/publications/uploaded_files/121/2013-ChapMini.pdf.

Randy Vance, Cobalt A25, Boating, Apr. 29, 2010, available at http://www.boatingmag.com/boats/cobalt-a25?image=3.

Metal Moulding Corp., Slide Out, Flip Up, Rotating Hinge, http://www.metalmoulding.com/Slide_out_flip_up_rotating_hinge.html (last visited Aug. 31, 2015).

Gary Polson; "Swim Platform Seats: An Attractive Nuisance to Children, Youth, & Adults?;" PropellerSafety.com; available at http://www.propellersafety.com/6893/legal-propeller/swim-platform-seats-attractive-nuisance/ (accessed Jun. 23, 2022).

"Glastron GTS 187 2014 for sale for $24,000—Boats-from-USA;" boats-from-usa.com; available at https://boats-from-usa.com/glastron/glastron-gts-187-78531 (accessed Jun. 23, 2022).

* cited by examiner

SLIDING SEAT BOTTOM FOR A BOAT

CROSS-REFERENCE TO RELATED APPLICATIONS

This application claims the benefit under 35 U.S.C. § 119(e) of U.S. Provisional Patent Application No. 63/183,559, filed May 3, 2021, and titled "Sliding Aft-Facing Transom Seat for a Boat," the entirety of which is incorporated herein by reference.

FIELD OF THE INVENTION

The invention relates to seating for a boat, particularly aft-facing seating in the stern of the boat.

BACKGROUND OF THE INVENTION

In recreational boating, there often are water activities off the stern of the boat, such as swimming and lounging, when, for example, the boat is anchored or beached. In such a case, people may want to sit in aft-facing seats in the stern of the boat to watch or engage with persons participating in the water activities. It is thus desired to have a boat with aft-facing seats possessing features configured to enhance the comfort of the seat occupant.

SUMMARY OF THE INVENTION

In one aspect, the invention relates to a boat that includes a hull with a bow and a transom, a seat support structure, and an aft-facing seat. The aft-facing seat is positioned proximate to the transom and is at least partially supported by the seat support structure. The aft-facing seat has a seat bottom configured to slide between an inward position and an outward position. When the seat bottom is in the outward position, the seat bottom is aft of its position in the inward position.

In another aspect, the invention relates to a boat that includes a seat support structure, and a seat at least partially supported by the seat support structure. The seat includes a seat bottom and a mounting plate attached to the seat bottom. The mounting plate includes a plurality of elongated slots to slidably couple the seat bottom to the seat support structure such that the seat bottom is slidable between an inward position and an outward position. Each of the elongated slots is elongated in a direction from the inward position toward the outward position.

In a further aspect, the invention relates to a boat that includes a bow, a stern, a transom, a seat support structure, and an aft-facing seat. The aft-facing seat is positioned proximate to the transom and is at least partially supported by the seat support structure. The seat includes a seat bottom and a mounting plate attached to the seat bottom. The mounting plate includes a plurality of elongated slots. The slots are elongated in a forward and aft direction. A plurality of fasteners are fastened to the seat support structure. Each of the plurality of fasteners is engaged with a corresponding one of the plurality of elongated slots to slidably couple the mounting plate to the seat support structure such that the seat bottom is slidable between an inward position and an outward position aft of the inward position.

These and other aspects of the invention will become apparent from the following disclosure.

BRIEF DESCRIPTION OF THE DRAWINGS

In FIG. 10, the seat bottom is in the outward position.

DETAILED DESCRIPTION OF THE PREFERRED EMBODIMENTS

As used herein, directional terms forward (fore), aft, inboard, and outboard have their commonly understood meaning in the art. Relative to the boat, forward is a direction toward the bow and aft is a direction toward the stern. Likewise, inboard is a direction toward the center of the boat and outboard is a direction away from the center of the boat.

Figure 1:
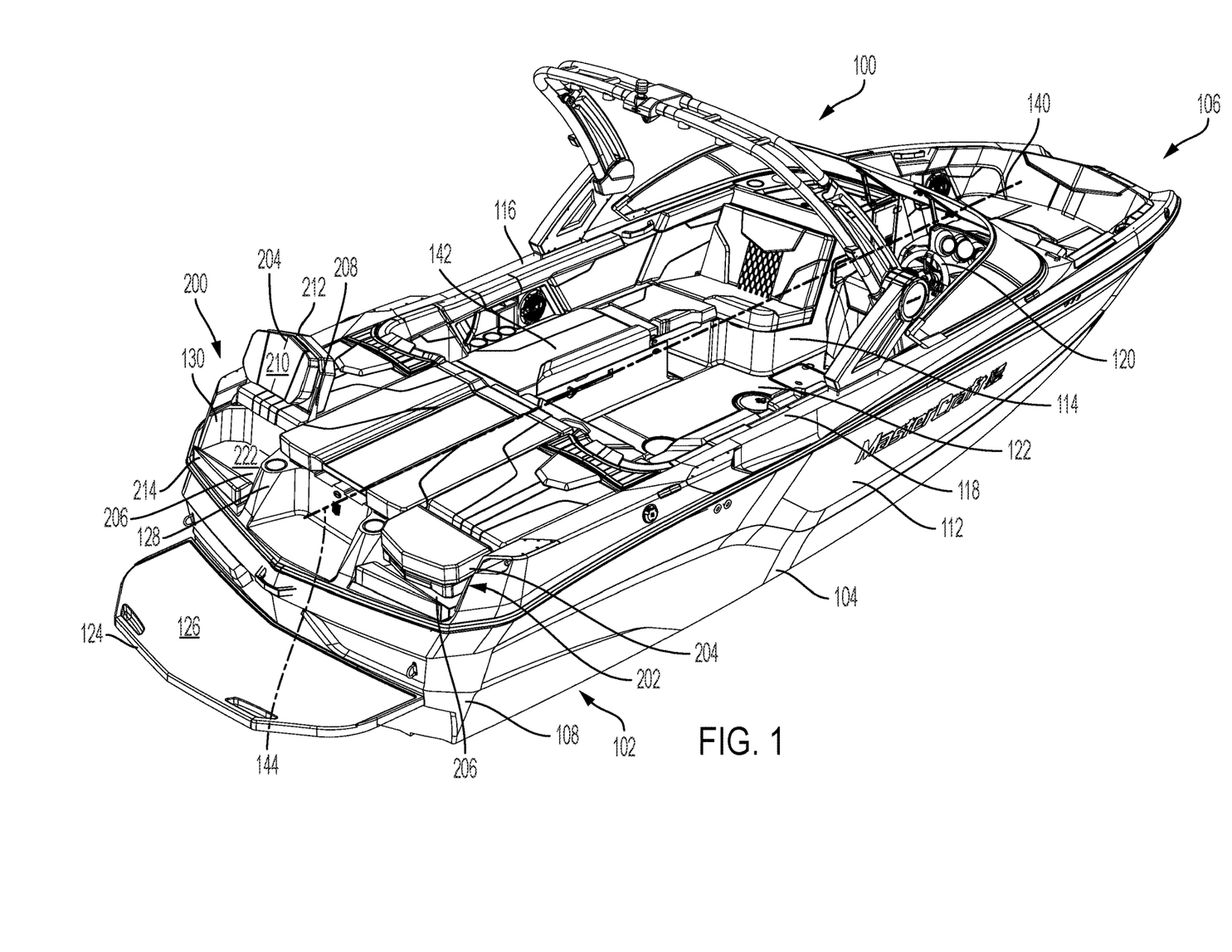
FIG. 1 is a perspective view of a boat having a pair of aft-facing seats with slidable seat bottoms according to a preferred embodiment of the invention.

FIG. 1 shows a boat 100 equipped with a pair of aft-facing seats 200, 202, in accordance with a first preferred embodiment of the invention. Each of the seats 200, 202 includes a seatback 204 and seat bottom 206. The seat bottom 206 is movable between an inward position and an outward position. The seatback 204 is movable between a folded position and an upright position, as will be discussed further below.

The boat 100 includes a stern 102, a hull 104 with a bow 106, a transom 108, a port side 110, and a starboard side 112. Collectively, the bow 106, the transom 108, and the port and starboard sides 110, 112 define an interior 114 of the boat 100. The port and starboard sides 110, 112 have port and starboard gunwales 116, 118, respectively. Within the boat's interior 114 is a control console 120 for operating the boat 100 and a floor 122.

The boat 100 includes a horizontal swim platform 124 attached to the transom 108 to make it easier for people to get in and out of the water and provide a place for watersport participants to put on and take off their gear. The swim platform 124 should be capable of supporting one or more people, and is preferably capable of supporting at least 500 lbs., and even more preferably 1250 lbs. When supporting a person, the person can stand or sit, for example, on an upper surface 126 of the swim platform 124. The swim platform 124 may be constructed from any suitable material that may be used in a marine environment including, for example, fiberglass and teak. The swim platform 124 can be an attachable/detachable platform or may be integrally formed with the hull 104 of the boat 100.

The boat 100 includes a seat support structure 128 and a cutout 130 in the stern 102 of the boat 100 as shown in FIG. 1. In this embodiment, the cutout 130 has a depth, width, and shape sufficient to house the seat bottom 206 and the seatback 204 when the seatback 204 is in the folded position, as shown for the starboard seat 202 in FIG. 1. The cutout 130 has a bottom surface 132, forward surface 134, an inboard surface 136, and an outboard surface 138 (see FIG. 7).

In the embodiment shown in FIG. 1, the boat 100 is a bowrider having a bow seating area 140 positioned in the bow 106 of the boat and a primary seating area 142 located in the interior 114 of the boat 100. Although the boat 100 depicted in FIG. 1 is a bowrider, this invention may be used with any suitable boat, including cuddies, center consoles, pontoon boats, and cruisers, for example.

As shown in FIG. 1, the aft-facing seats 200, 202 are located in the stern 102 of the boat 100, proximate the transom. A port aft-facing seat 200 is located on the port side of the centerline 144 of the boat 100, and a starboard aft-facing seat 202 is located on the starboard side of the centerline 144. As shown in this embodiment, the person faces directly aft when the seat is occupied; that is, the plane of the seatback 204 of each aft-facing seat 200, 202 is generally orthogonal to the centerline 144 of the boat 100. However, the aft-facing seats 200, 202 do not need to be positioned to face the occupant directly aft. Instead, some deviations are contemplated to be within the scope of the invention, including, for example, angling the seatback 204 up to and including 45 degrees relative to the centerline 144 of the boat 100.

As noted, each aft-facing seat 200, 202 is positioned proximate to the transom 108 of the boat 100. In the embodiment shown in FIG. 1, each aft-facing seat 200, 202 is positioned over the transom 108, more specifically, the seat bottom 206 is positioned over the transom 108 when the seat bottom 206 is in either the inward position or the outward position. In the preferred embodiment shown, when seated in the aft-facing seats 200, 202, the majority of an adult occupant's body is positioned forward of the transom 108, and the occupant's legs extend aft, over the transom 108. However, the aft-facing seats 200, 202 may be positioned farther forward, such that the seat bottom 206 is forward of the transom in at least the inward position and optionally also the outward position. If desired, the seat bottom 206 may be positioned such that no part of an occupant's body extends after over the transom 108 in either the inward position or the outward position.

Although the seats 200, 202, are described herein as aft-facing seats, they are not so limited, and the seats 200, 202 and features thereof may be used in other locations within the boat 100 and in other orientations. These other locations include, but are not limited to, the bow seating area 140 and the primary seating area 142, and include other orientations such as forward-facing, inboard-facing, and outboard-facing, for example.

The port aft-facing seat 200 and the starboard aft-facing seat 202 are mirror images of each other in this embodiment. As such, the following discussion of the port aft-facing seat 200 is equally applicable to the starboard aft-facing seat 202.

As noted above, the aft-facing seat 200 includes a seat bottom 206 and a seatback 204. The seatback 204 includes a pivot mechanism 208, an aft-facing surface 210, and a top surface 212. The seat bottom 206 includes an aft edge 214, a forward edge 216, an inboard edge 218, an outboard edge 220, and a seating surface 222. The seat bottom 206 and the seatback 204 each comprise a structural member covered by a cushion on at least the side facing the occupant. The structural member of the seat bottom 206 is a plate 224 (see FIG. 11), which will be discussed further below. Preferably, the cushions are constructed from a soft, but supportive, material, such as triple-density foam, and are covered with a waterproof material, such as premium grade vinyl. The seat structural member may be made from any structural material suitable for the marine environment and capable of supporting the weight of an adult.

Figure 2:
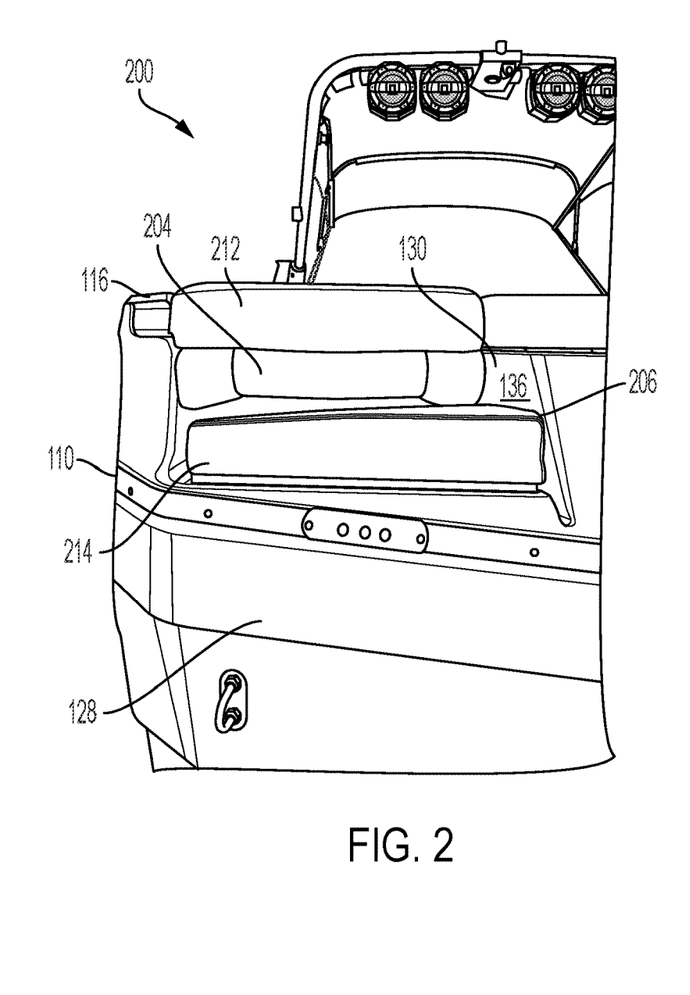
FIG. 2 is an aft view of the port aft-facing seat shown in FIG. 1 with a seatback of the aft-facing seat in a folded position.
Figure 3:
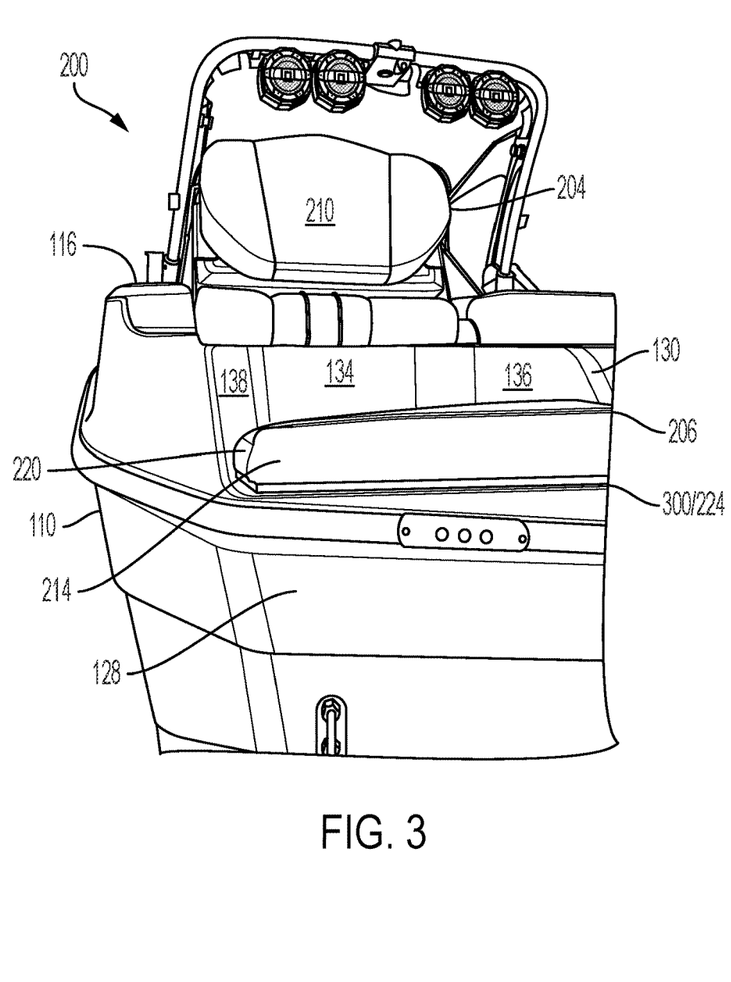
FIG. 3 is an aft view of the port aft-facing seat shown in FIG. 2 with the seatback in an upright position.

The seatback 204 of this embodiment is movable between a folded position and an upright position. In FIG. 1, the seatback 204 of the starboard aft-facing seat 202 is shown in the folded position, and the seatback 204 of the port aft-facing seat 200 is shown in the upright position. FIGS. 2 and 3 show an aft view of the port aft-facing seat 200. In FIG. 2, the seatback 204 is in the folded position, and in FIG. 3, the seatback 204 is in the upright position. When in the folded position, as shown in FIG. 2, the seatback 204 is parallel to both the seat bottom 206 and the bottom surface 132 of the cutout 130, such that the seatback 204 can nest within the cutout 130. When in the folded position, the top surface 212 of the seatback 204 faces aft. In certain embodiments, when in the folded position, the seatback 204 sits or rests on top of the seat bottom 206, as shown in FIG. 2. When in the upright position, as shown in FIG. 3, the seatback 204 is parallel to the forward surface 134 of the cutout 130. Also, in the upright position, the seatback 204 is capable of supporting the back of a person seated in the aft-facing seat 200. When in the upright position, the angle $\alpha$ between the aft-facing surface 210 and the seating surface 222 is set so that a person can comfortably sit in the aft-facing seat 200. Preferably, this angle $\alpha$ is 90 degrees or greater, more preferably from 95 degrees to 135 degrees.

The seatback 204 includes a pivot mechanism 208 that allows the seatback 204 to move between the folded and upright positions, and any suitable pivot mechanism 208 may be used. In this embodiment, for example, each seatback 204 includes two pivot mechanisms 208 as shown in FIG. 3. One pivot mechanism 208 is located on the inboard side of the seatback 204, and one pivot mechanism 208 is located on the outboard side of the seatback 204. The pivot mechanism 208 of this embodiment includes a seat back bracket 209 as shown in FIG. 3, and a base bracket (not shown). The seat back bracket 209 is connected to the seatback 204 and the base bracket is connected to the seat support structure 128. In this embodiment, the seat back bracket 209 and the base bracket are directly connected to the seatback 204 and the seat support structure 128, respectively, using fasteners, including, for example, screws. However, any suitable means of attachment may be used including but not limited to bolts, rivets, welding, adhesive, and the like. The seatback bracket 209 and the base bracket are pivotably connected to each other, enabling the seatback bracket 209, and thus the seatback 204, to pivot relative to the base bracket. In this embodiment, the pivotable connection between the seatback bracket 209 and the base bracket is made using a pin, such as the shank of a rivet or other fastener, such as a bolt, but any suitable pivotable connection may be used. Alternative pivot mechanisms may be used including, for example, hinges.

In this embodiment, the seatback 204 is manually movable between the folded position and the upright position by a person grasping a portion of the seatback 204 and moving it, but in other embodiments, the seatback 204 may be automatically movable by a suitable actuation mechanism to pivot the seatback 204 between the folded position and the upright position.

Figure 4:
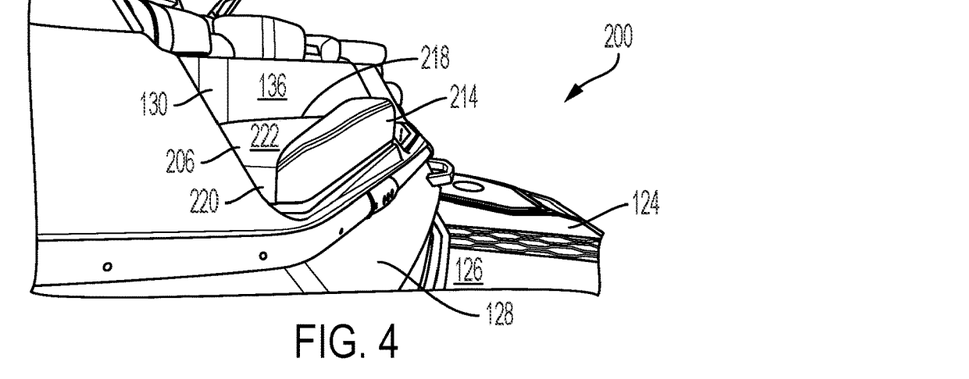
FIG. 4 is a side view of the port aft-facing seat of FIG. 2 with the seat bottom in an inward position.
Figure 5:
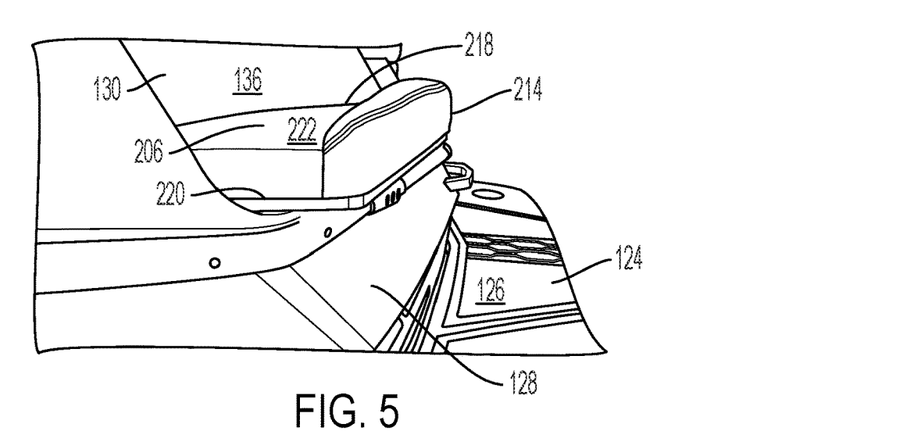
FIG. 5 is a side view of the port aft-facing seat of FIG. 2 with the seat bottom in an outward position.

As noted above, the seat bottom 206 of this embodiment is movable. In particular, the seat bottom 206 is configured to slide between an inward position and an outward position. FIGS. 4 and 5 are side views of the seat bottom 206 of the port aft-facing seat 200. In FIG. 4, the seat bottom 206 is in the inward position, and in FIG. 5, the seat bottom 206 is in the outward position. In this embodiment, when the seat bottom 206 is in the outward position, the seat bottom 206 has moved aft relative to its inward position. In the embodiment shown in FIG. 5, when in the outward position, a portion of the seat bottom 206 extends aft of the transom 108. When in the inward position, the aft edge 214 of the seat bottom 206 preferably is forward of or flush with the transom 108 and the inboard edge 218 of the seat bottom 206 preferably does not extend beyond the aft-most edge of the inboard surface 136 of the cutout 130. When the aft edge 214 is forward of the transom 108, the seat bottom 206 resides in the cutout 130 as shown in FIG. 4, and the forward edge 216 of the seat bottom 206 is close to the forward surface 134 of the cutout 130. In some embodiments, the forward edge 216 of the seat bottom 206 may abut the forward surface 134 of the cutout 130, but in other embodiments, the forward edge 216 of the seat bottom 206 may be within a half inch of the forward surface 134 of the cutout 130. Further, when in the inward position, the aft edge 214 preferably is forward of the forward-most edge of swim platform 124 as shown in FIG. 4. When in the outward position, a portion of the seat bottom 206 and the seating surface 222 extends out of the cutout 130. In this embodiment, a portion of the inboard and outboard edges 218, 220 of the seat bottom 206 extend beyond the inboard and outboard surfaces 136, 138 of the cutout 130 as shown in FIG. 5. When in the outward position, the aft edge 214 is anywhere from 2 inches to 5 inches aft of where it is in the inward position.

Figure 6:
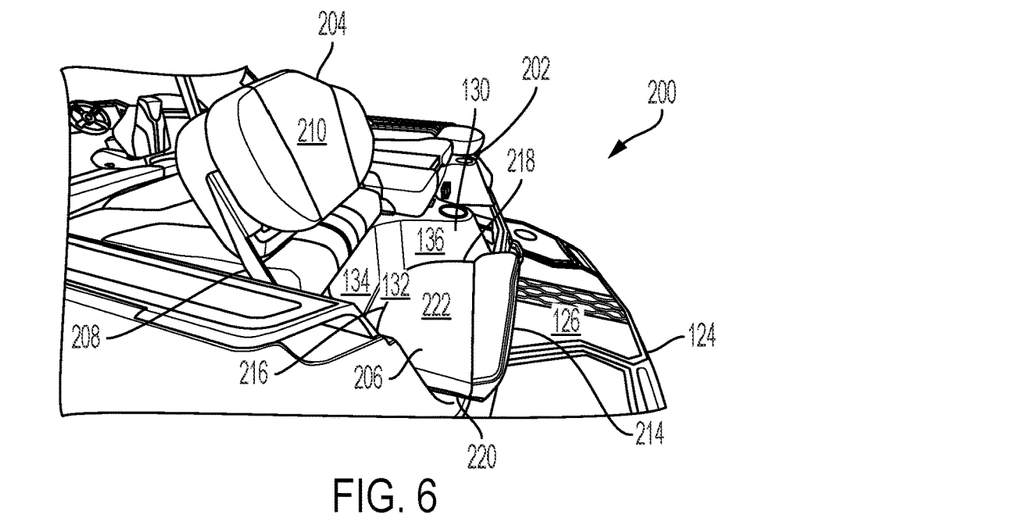
FIG. 6 is a perspective view of the port aft-facing seat of FIG. 2 with the seatback in the upright position and the seat bottom in the outward position.

In some embodiments, the aft edge 214 of the seat bottom 206 may extend over the swim platform 124 in the outward position, such that the aft edge 214 extends aft of the forward-most edge of the swim platform 124 as shown in FIG. 6. FIG. 6 is a perspective view of the port aft-facing seat 200 of FIG. 2 with the seatback 204 in the upright position and the seat bottom 206 in the outward position. In this embodiment, when in the outward position, a portion of the inboard and outboard edges 218, 220 of the seat bottom 206 extend aft of the forward-most edge of the swim platform 124. In this embodiment, the seat bottom 206 is at a level higher than the upper surface 126 of the swim platform 124.

Figure 7:
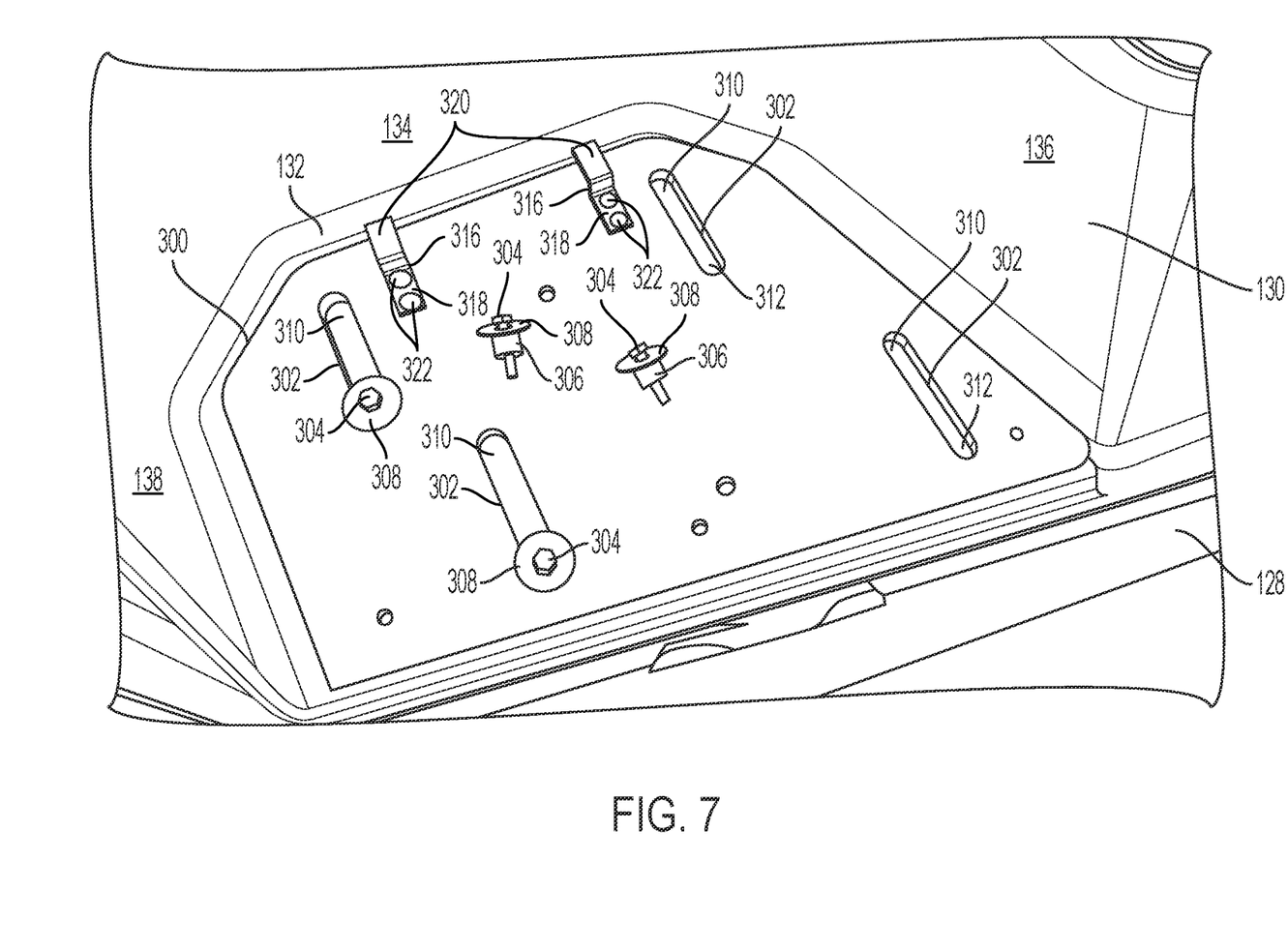
FIG. 7 shows a mounting plate for the seat bottom of the port aft-facing seat of FIG. 2. The mounting plate is shown in the inward position.
Figure 8:
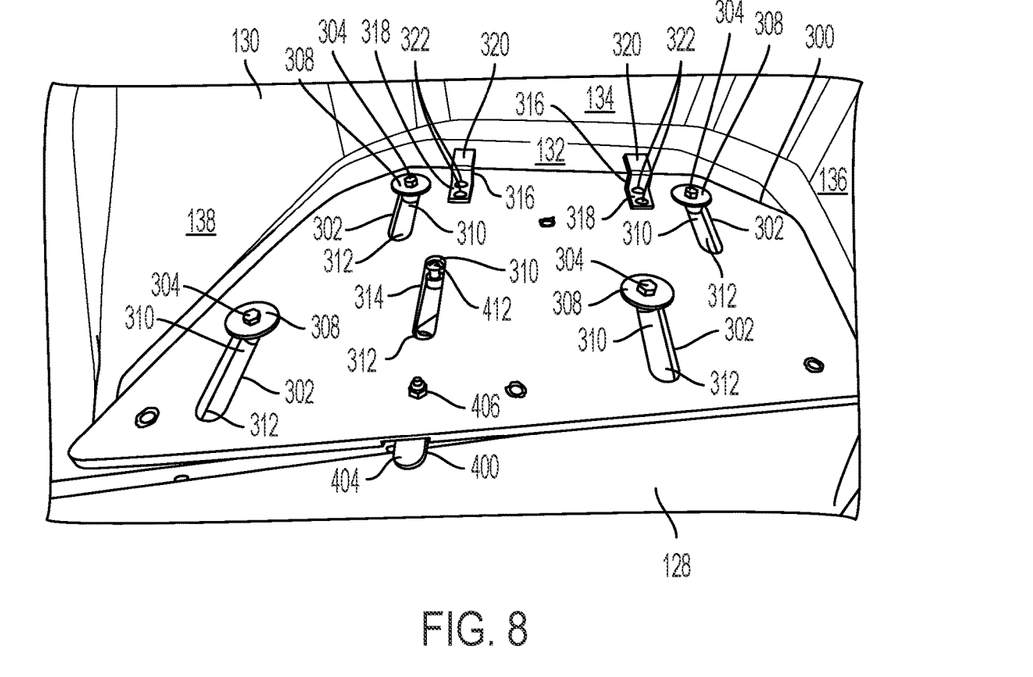
FIG. 8 is the mounting plate of FIG. 7 shown in the outward position.
Figure 9:
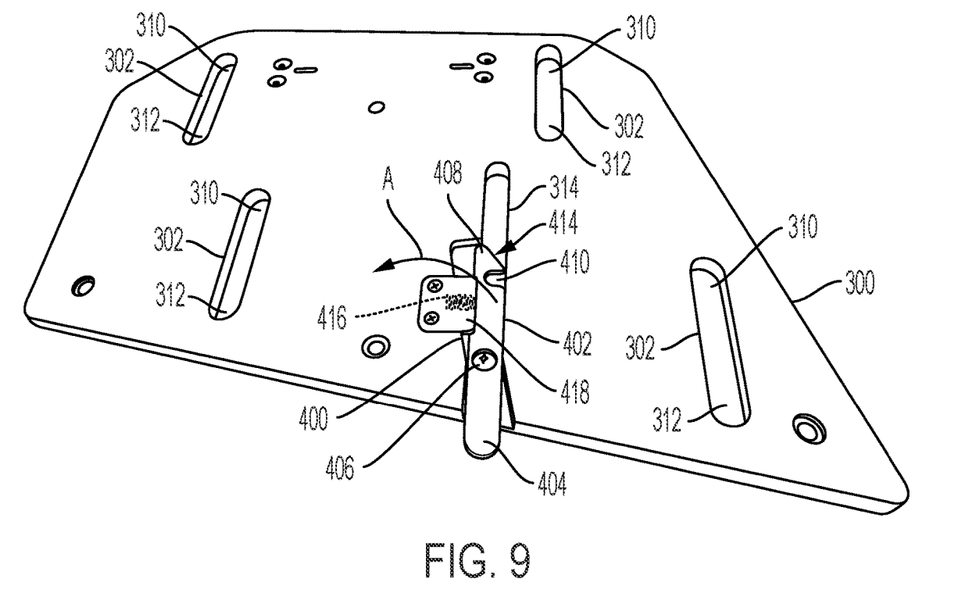
FIG. 9 is the mounting plate of FIG. 7 removed from the boat to show the underside of the plate.

Various suitable mechanisms may be used to enable the seat bottom 206 to slide, but in this embodiment the aft-facing seat 200 includes a novel mounting plate 300. The mounting plate 300 is shown in FIGS. 7-9. The mounting plate 300 allows the seat bottom 206 to slide from the inward position to the outward position. In the inward position the seat occupant is seated in the upright position. In the outward position the seat occupant is seated in a more comfortable and relaxed reclined position. The construction of the mounting plate 300 creates a more comfortable aft-facing seat 200 as compared to one in which the seat bottom 206 does not move. Within a fraction of a second the seat 200 is able to slide out so that a person seated in an upright position can transition to a more relaxed and reclined position. Additionally, the sliding mechanism of the mounting plate 300 is a cost-effective solution to move the seat bottom 206 between the upright position and a reclined position. In this embodiment, the seat bottom 206 has a single outward position, but in alternative embodiments the seat bottom 206 can have a plurality of intermediate positions between the inward position and the outward-most position.

FIGS. 7 and 8 show the mounting plate 300 for the seat bottom 206 of the port aft-facing 200 seat of FIG. 2 installed in the cutout 130 of the boat 100. FIG. 7 shows the mounting plate 300 is in the inward position, and FIG. 8 shows the mounting plate 300 in the outward position. As shown in FIG. 7, the mounting plate 300 may be a 0.45-inch-thick plate of plastic, such as high-density polyethylene, for example. While the mounting plate 300 shown in this embodiment is made of plastic, the mounting plate 300 can be made of any other suitable material, such as metal. The mounting plate 300 is slidably coupled to at least one of the seat bottom 206 and the seat support structure 128 such that the seat bottom 206 is slidable between an inward position and an outward position. In this embodiment, the mounting plate 300 is slidable relative to the seat support structure 128, but the mounting plate 300 may be similarly slidably attached to the seat bottom 206. In this embodiment, the mounting plate 300 includes a plurality of slots 302, and a corresponding bolt 304 extends through each of the slots 302. The bolt 304 engages with the seat support structure 128, and more specifically threads formed in the seat support structure 128, to bolt the mounting plate 300 to the seat support structure 128. Instead of a bolt 304, other suitable fasteners, such as screws or rivets, for example, may be used. In some embodiments, the threads may be tapped into in the seat support structure 128 before the bolt 304 is inserted or an insert nut may be used. A bushing 306 may be used with the bolt 304. In this embodiment, the bushing 306 is preferably a plastic, such as nylon. The bushing 306 includes a hole, and the bolt 304 is inserted through the hole in the bushing 306. The bushing 306 also includes at least one exterior surface. In some embodiments, the bushing 306 is cylindrical and includes a circumferential exterior surface. The exterior surfaces of the bushing 306, such as the exterior circumferential surface of the cylindrical bushing 306, form a bearing surface with the sides of the slots 302. Accordingly, the sides of the slots 302 rub (bear) against the bushing 306 instead of the bolt 304. In this embodiment, the bolt 304 is a $\frac{5}{16}$ inch bolt, and a 0.75 inch nylon bushing 306 is used. An oversized fender washer 308 is used to help keep the mounting plate 300 attached to the seat support structure 128.

Although any suitable number of slots 302 may be used, the exemplary mounting plate 300 shown in FIG. 7 has four. The four slots 302 are parallel and spaced apart from each other. Each slot 302 is elongated in a direction from the inward position toward the outward position to allow the mounting plate 300 of the seat bottom 206 to slide between the inward position and the outward position. In the embodiment shown in FIG. 7, the slots 302 are elongated in a direction from fore to aft. Each slot 302 has a forward end 310 and an aft end 312. When in the inward position, the bolt 304 is located at the aft end 312 of the slot 302 as shown in FIG. 7. When the seat bottom 206 is moved from the inward position to the outward position, the slots 302 permit the mounting plate 300 to move by sliding relative to the bolts 304. When in the outward position, the bolt 304 is located at the forward end 310 of the slot 302 as shown in FIG. 8. While the seat bottom 206 in this embodiment is configured to slide along the elongated slots 302 of the mounting plate 300, the seat bottom 206 can be configured to slide via other mechanisms or systems including, but not limited to, rails, tracks, or rollers.

As noted above, the slots 302 are parallel to each other and spaced apart from each other. In this embodiment, of the four slots 302, two are positioned on the forward half of the mounting plate 300 and two are positioned on the aft half of the mounting plate 300. The slots 302 depicted are each entirely within either the aft half or forward half, but in some embodiments, the slots 302 may span from the forward half to the aft half. The slots 302 in the forward half are offset from the slots 302 in the aft half. Specifically, the slots 302 are offset in a direction perpendicular to the direction in which they are elongated, which in this embodiment is an inboard and outboard direction. Other suitable arrangements of the slots 302 may be used, such as one or more slots in the forward half aligned with one or more slots in the aft half.

In certain embodiments, the mounting plate 300 includes a locking mechanism 400 configured to lock the seat bottom 206 in at least one of the inward position, the outward position, or one or more intermediate positions. FIG. 9 shows the underside of the mounting plate 300 with the locking mechanism 400. The locking mechanism 400 can also be seen in FIG. 8. The locking mechanism 400 may be a latch as shown in FIG. 9. In this embodiment, the latch (locking mechanism) includes a lever 402. The lever 402 includes a handle end 404, a pivot 406, and hook end 408.

The handle end 404 of the lever 402 allows the seat occupant to operate the locking mechanism 400. In this embodiment, the handle end 404 protrudes from the aft end of the mounting plate 300 an amount sufficient to be moved, as discussed below, by at least one finger of an operator. The lever 402 is pivotably connected to the mounting plate 300 by the pivot 406, and the locking mechanism 400 operates via the pivot 406. More specifically, the pivot 406 allows the lever 402 to rotate. Any suitable pivot 406 may be used, but in this embodiment a carriage bolt is inserted into a hole in the lever 402 between the handle end 404 and the hook end 408. The carriage bolt is inserted through a hole in the mounting plate 300 and secured with a nut.

The hook end 408 includes a hook 410 that engages with a stud 412 (or other fastener). The stud 412 is engaged with the seat support structure 128. When the hook 410 engages the stud 412, the mounting plate 300 is locked. The hook end 408, more specifically the hook 410, is located at the aft end 312 of a locking slot 314 as shown in FIG. 8. When locked in the inward position, the stud 412 is located at the aft end 312 of the locking slot 314. In this embodiment, the locking mechanism 400 is configured to lock the seat bottom 206 in the inward position. When a user rotates the handle end 404 in direction A, as shown in FIG. 9, the lever 402 rotates about the pivot 406 and the hook end 408 also rotates in direction A to disengage the hook 410 from the stud 412. The mounting plate 300 is then free to slide aft and the stud 412 moves within the locking slot 314 from the aft end 312 to the forward end 310 of the locking slot 314, as shown in FIG. 8. The hook end 408 of the lever 402 also includes a tapered surface 414. When the mounting plate 300 is moved forward to the inward position, the tapered surface 414 contacts the stud 412 causing the lever 402 to rotate in a direction opposite direction A so that the hook 410 can re-engage the stud 412.

A biasing member, such as a spring 416, may be used to keep the hook 410 engaged with the stud 412. The user and the tapered surface 414 move the lever 402 against the force of the spring 416. Although the spring is shown in FIG. 9 is a compression spring positioned under a retention plate 418, other suitable biasing members may be used, such as a torsion spring located on the pivot 406.

As noted above, the seat bottom 206 may have a plurality of intermediate positions between the inward position and the outward-most position. In such a case, the lever 402 may include a plurality hooks 410 that engage the stud 412 and lock the seat bottom 206 and, more specifically, the mounting plate 300, in one of a plurality of positions. The plurality hooks 410 may be spaced apart from each other in a linear arrangement on the hook end 408 of the lever 402.

Figure 10:
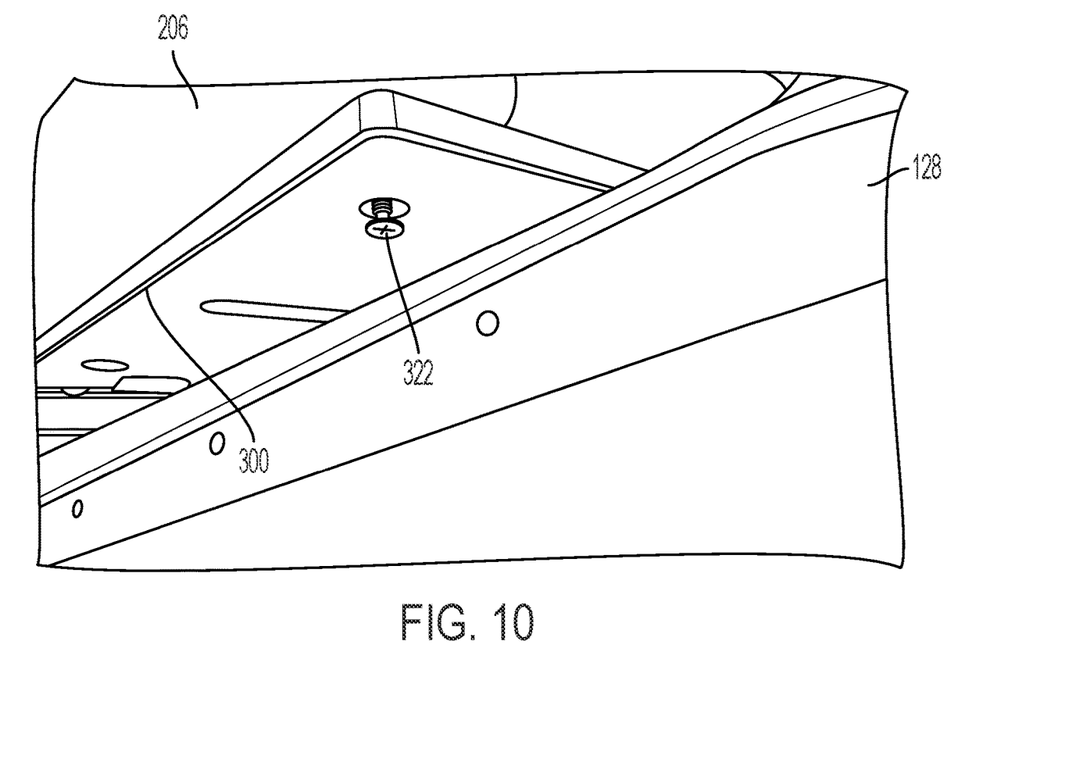
FIG. 10 is a perspective view of the port aft-facing seat shown in FIG. 5, showing the underside of the mounting plate attached to the seat bottom.

The mounting plate 300 also includes clips 316 as shown in FIG. 8. In this embodiment, the clips 316 shown are z-clips. The z-clips have two legs, a mounting plate leg 318 and a seat bottom leg 320. The mounting plate leg 318 is attached to the mounting plate 300 with screws 322. The seat bottom leg 320 of the z-clip 316 engages with the seat bottom 206. In this embodiment, the underside of the seat bottom 206 directly attaches to the mounting plate 300 via the clips 316. Screws 322 are used to directly attach the mounting plate 300 to the underside of the seat bottom, as shown in FIG. 10. FIG. 10 shows the underside of the mounting plate 300 attached to the seat bottom 206 and installed on the boat 100. The seat bottom 206 is in the outward position in FIG. 10. In this embodiment, each screw 322 passes through a hole formed in the mounting plate (see FIGS. 9 and 10) and engages with the seat bottom 206 to directly attach the seat bottom 206 to the mounting plate 300.

Figure 11:
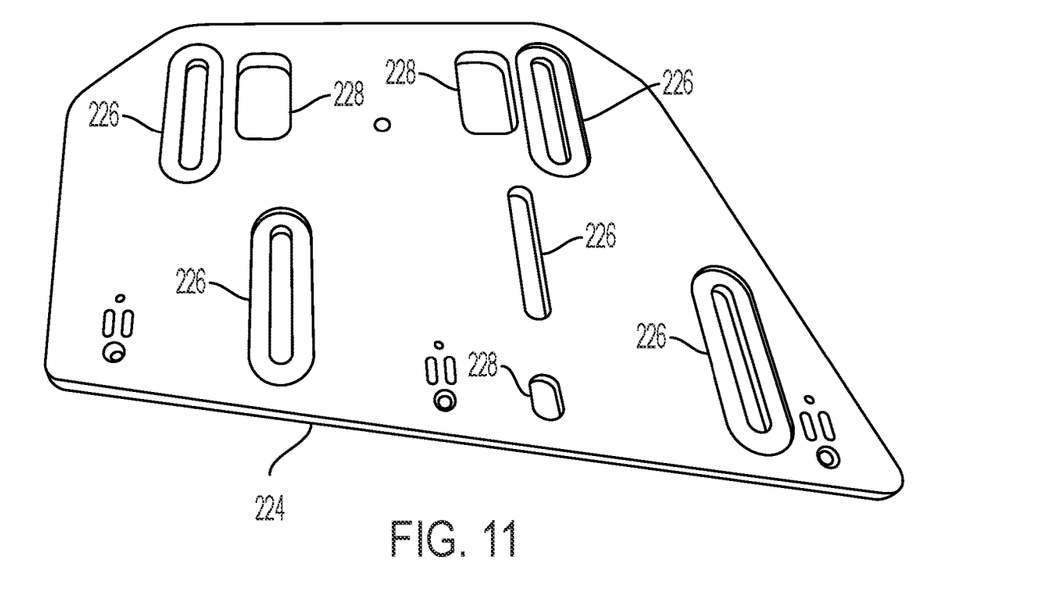
FIG. 11 shows a structural member of the seat bottom.

FIG. 11 shows the underside of the seat bottom 206 with the cushions and vinyl removed. The underside of the seat bottom 206 includes a plate 224 with milled dados 226 and holes 228 as shown in FIG. 11. The milled dados allow movement of the head of the bolt 304 and fender washer 308 of the mounting plate 300. The dados provide clearance for the heads of the bolts 304 so that the seat bottom 206 can slide with the mounting plate 300 without the heads of the bolts 304 interfering with the seat bottom 206. The seat bottom leg 320 of the z-clip 316 can be inserted through a corresponding hole 228 formed in the plate 224 of the seat bottom 206. The seat bottom leg 320 of the z-clip 316 then engages the plate 224 of the seat bottom 206 by sandwiching the plate 224 between the mounting plate 300 and the seat bottom leg 320 of the z-clip 316.

Alternatively, the mounting plate 300 can be indirectly attached to the boat 100 and/or seat bottom 206. For example, if the seat bottom 206 is configured to slide on a rail or track, the mounting plate 300 can be indirectly attached to the boat 100 and the seat bottom 206 via the track or rail system.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A boat comprising:
  a hull including a bow and a transom;
  a seat support structure including a cutout; and
  an aft-facing seat positioned proximate to the transom and at least partially supported by the seat support structure, the aft-facing seat including a seat bottom configured to slide between an inward position and an outward position, the seat bottom being located in the cutout,
  wherein, when the seat bottom is in the outward position, the seat bottom is aft of its position in the inward position.

2. The boat of claim 1, wherein a portion of the seat bottom extends aft of the transom when the seat bottom is in the outward position.

3. The boat of claim 2, wherein the seat bottom includes an aft edge that is forward of the transom when the seat bottom is in the inward position.

4. The boat of claim 1, further comprising a swim platform, wherein a portion of the seat bottom extends over the swim platform when the seat bottom is in the outward position.

5. The boat of claim 4, wherein the seat bottom includes an aft edge that is forward of the swim platform when the seat bottom is in the inward position.

6. The boat of claim 1, wherein the seat bottom is configured to slide aft anywhere from 2 inches to 5 inches when the seat bottom moves from the inward position to the outward position.

7. The boat of claim 1, wherein the seat bottom further includes a locking mechanism configured to lock the seat bottom in at least one of the inward position and the outward position.

8. The boat of claim 1, wherein the aft-facing seat further includes a seatback.

9. The boat of claim 8, wherein the seatback is movable between a folded position and an upright position.

10. The boat of claim 9, wherein, in the folded position, the seatback is parallel to the seat bottom.

11. The boat of claim 9, wherein the seatback includes an aft-facing surface in the upright position, the seat bottom includes a top surface, and an angle formed between the aft-facing surface of the seatback in the upright position and the top surface of the seat bottom is 90 degrees or greater.

12. The boat of claim 1, wherein the cutout is in the shape of the seat bottom.

13. A boat comprising:
a seat support structure; and
a seat at least partially supported by the seat support structure, the seat including:
 a seat bottom; and
 a mounting plate attached to the seat bottom, the mounting plate including a plurality of elongated slots to slidably couple the seat bottom to the seat support structure such that the seat bottom is slidable between an inward position and an outward position, with each of the elongated slots being elongated in a direction from the inward position toward the outward position; and
 a plurality of fasteners fastened to the seat support structure, each of the plurality of fasteners being engaged with a corresponding one of the plurality of elongated slots to slidably couple the mounting plate to the seat support structure.

14. The boat of claim 13, wherein the mounting plate is attached directly to the seat bottom with at least one of a clip or a fastener.

15. The boat of claim 13, wherein the slots are parallel and spaced apart from each other.

16. The boat of claim 13, further comprising a stud engaged with the seat support structure, wherein the seat further includes a locking mechanism releasably engaging the stud such that the seat bottom is releasably lockable in at least one of the inward position and the outward position.

17. The boat of claim 16, wherein the seat bottom is releasably lockable in one or more intermediate positions between the inward position and the outward position.

18. The boat of claim 16, wherein the locking mechanism further includes a lever having a hook that releasably latches onto the stud to lock the seat bottom in at least one of the inward position and the outward position.

19. A boat comprising:
a bow, a stern, and a transom;
a seat support structure; and
an aft-facing seat positioned proximate to the transom and at least partially supported by the seat support structure, the seat including:
 a seat bottom;
 a mounting plate attached to the seat bottom, the mounting plate including a plurality of elongated slots elongated in a forward and aft direction; and
 a plurality of fasteners fastened to the seat support structure, each of the plurality of fasteners engaged with a corresponding one of the plurality of elongated slots to slidably couple the mounting plate to the seat support structure such that the seat bottom is slidable between an inward position and an outward position aft of the inward position.

20. The boat of claim 19, wherein the seat support structure includes a cutout and the seat bottom is located in the cutout.

* * * * *